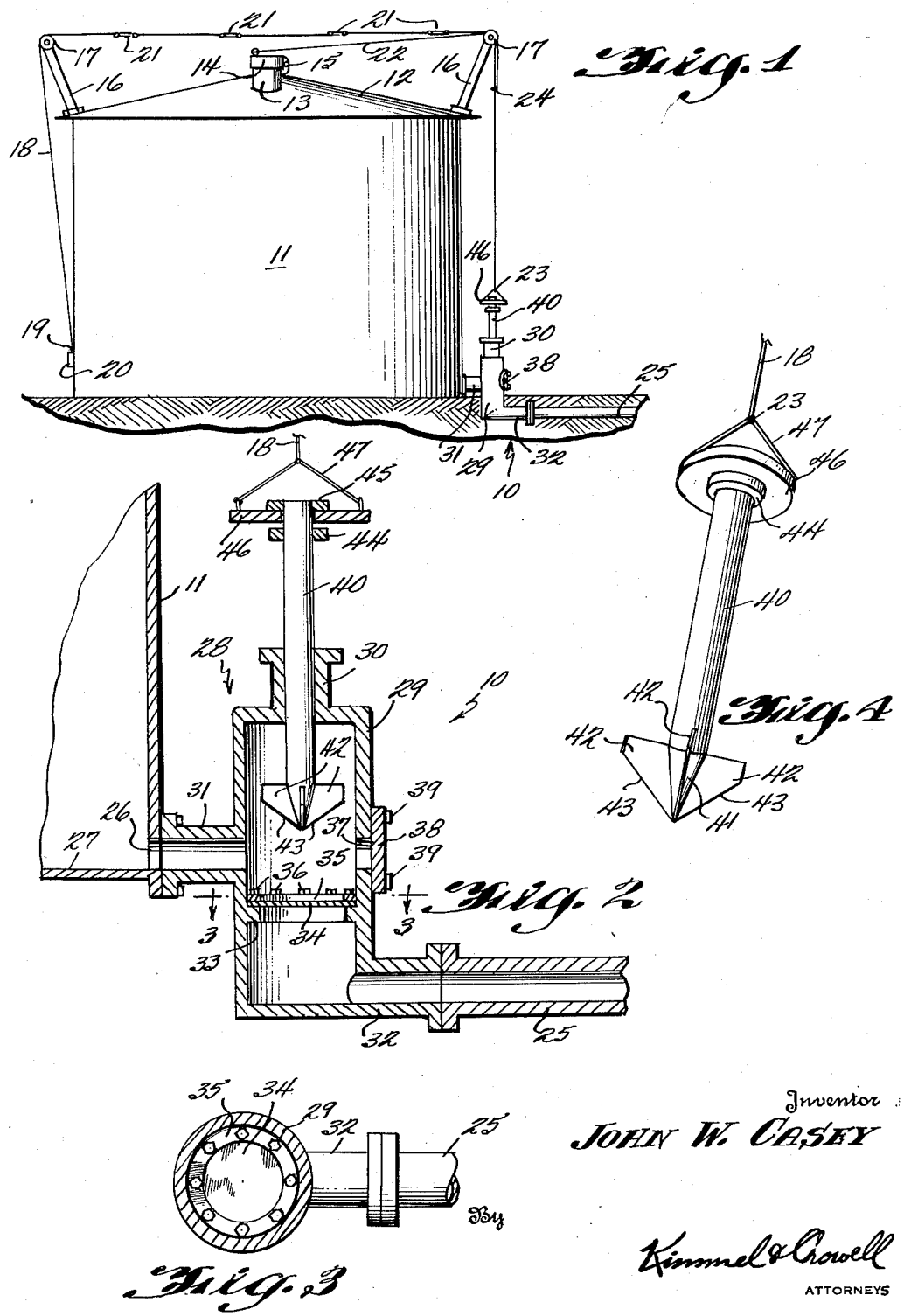

United States Patent Office 3,001,536
Patented Sept. 26, 1961

1

3,001,536
OIL TANK SAFETY VALVE
John W. Casey, 1013 E. Monroe St., Harlingen, Tex.
Filed July 23, 1959, Ser. No. 829,054
1 Claim. (Cl. 137—68)

The present invention relates to an oil tank safety valve and is an improvement on my prior Patent 2,863,469 issued December 9, 1958 entitled "Oil Tank Safety Valve."

The primary object of the invention is to provide an improved valve structure for use in an oil tank safety valve system of the type which will automatically open a drainage line to permit the escape of the contents of the tank into an underground safety tank should the tank's contents become ignited, wherein the valve is absolutely leak-proof under non-emergency conditions.

Another object of the invention is to provide a valve structure of the class described above in which a diaphragm is ruptured to permit the flow of oil from the oil tank.

A still further object of the invention is to provide a valve structure of the class described above which is inexpensive to manufacture, easy to install, and is quick to operate under emergency conditions.

Other objects and advantages will become apparent in the following specification when considered in light of the attached drawings, in which:

FIGURE 1 is a side elevation of the invention; shown attached to an oil tank;

FIGURE 2 is an enlarged fragmentary vertical sectional view taken through the valve structure;

FIGURE 3 is a fragmentary horizontal section taken along the line 3—3 of FIGURE 2, looking in the direction of the arrows; and FIGURE 4 is a fragmentary perspective view of the valve actuator shown removed from the valve body.

Referring now to the drawings in detail wherein like reference characters indicate like parts throughout the several figures, the reference numeral 10 indicates generally an oil tank safety valve apparatus constructed in accordance with the invention.

The oil tank safety valve apparatus 10 is adapted for attachment to a conventional cylindrical oil tank 11 having a relatively flat semi-conical top 12 closing the upper end thereof. A vent pipe 13 is mounted in the cover 12 adjacent the center thereof and has a sealing lid 14 secured to the upper end thereof by means of a hinge 15.

A pair of upwardly and outwardly extending brackets 16 are secured to the outer edges of the cover 12 in diametrically opposed relation and each have a sheave 17 journalled to the upper end thereof. A cable 18 is trained over the sheaves 17 and has an end 19 anchored at 20 to the tank 11. The cable 18 has a plurality of fusable links 21 arranged therein to overlie the tank 11. Melting of the links 21 upon ignition of the contents of the tank 11 will separate the cable 18, for reasons to be assigned.

A cable 22 is connected to the lid 14 and is trained over on of the sheaves 17 overlying the end 23 of the cable 18. The cable 22 is connected to the cable 18 by a connection 24 adjacent to but spaced above the end 23 of the cable 18.

A pipe 25 extends from a point adjacent but below the tank 11 to an underground tank (not shown) to carry oil from the tank 11 to the underground tank under emergency conditions.

The tank 11 has an outlet port 26 formed in the side wall thereof adjacent the bottom wall 27.

A valve body, generally indicated at 28, is positioned between the tank 11 and the pipe 25 and has an upstanding cylindrical hollow central housing 29 provided with an axial shaft bushing 30 extending upwardly therefrom.

2

A conduit 31 is integrally formed on the side of the housing 29 intermediate the upper and lower ends thereof. For assembly of the valve 10 it is obvious that the top part including the bushing 30 may be removably mounted on the housing 29 secured by bolts, not shown, the valve 10 being shown as in FIGURE 2 for sake of simplicity. The conduit 31 is removably attached to the tank 11, providing communication between the tank 11 and the housing 29. A conduit 32 is integrally formed in the lower end of the housing 29 and extends radially outwardly therefrom. The conduit 32 is arranged in axially aligned relation to the pipe 25 and is connected thereto.

The housing 29, adjacent to but below the conduit 31, is provided with a radially inwardly extending horizontal annular flange 33. A frangible circular disk 34 is supported on the flange 33 and has a clamping ring 35 engaged thereover, as can be clearly seen in FIGURE 2. A plurality of securing elements 36 extend through the clamping ring 35, the disk 34, into the flange 33 to clamp the disk 34 to the flange 33 in sealed relation thereto.

The housing 29 has an access opening 37 formed therein oppositely of and in line with the conduit 31 to permit access to the frangible disk 34, clamping ring 35 and securing elements 36. A sealing cover 38 is detachably secured to the housing 29 by a plurality of securing elements 39 to seal the access opening 37 for normal operations.

A shaft 40 is mounted for vertical sliding movement through the shaft bushing 30 into and out of the housing 29 in sealed relation thereto. The lower end of the shaft 40 is tapered to a cone-shaped point 41 and has a plurality of relatively thin cutting vanes 42 rigidly secured thereto in radially extending relation. Each of the vanes 42 has an upwardly and outwardly sloping cutting edge 43 formed at the bottom thereof to pierce the frangible disk 34 upon downward movement of the shaft 40.

The shaft 40 has a pair of collars 44, 45 secured to the upper end thereof in vertically spaced relation to hold a disk-shaped weight 46 in loosely encompassing relation to the shaft 40 between the collars 44, 45. A yoke 47 has its opposite ends secured to the weight 46 and is centrally connected to the end 23 of the cable 18 to support the weight 46, shaft 40 and blades 42 in a raised position with the blades 42 spaced well above the frangible disk 34.

In the use and operation of the invention, should the contents of the tank 11 become ignited the heat therefrom will melt the fusible links 21 separating the cable 18 so that the weight 46 will pull the end 23 of the cable 18 downwardly toward the housing 29. The weight 46 through the cable 22 connected to the cable by the fitting 24 will open the lid 14 to vent the tank 11. Downward movement of the weight 46 will cause the blades 42 to rupture the frangible disk 34, permitting the contents of the tank 11 to flow through the conduit 31, housing 29, conduit 32 and pipe 25 into the underground tank mentioned above.

It should be understood that suitable flame arresters as well as conventional shut-off valves may be utilized with the valve apparatus 10 where desired.

Having thus described the preferred embodiment of the invention, it should be understood that numerous structural modifications and adaptations may be resorted to without departing from the scope of the appended claim.

What is claimed is:

A gravity-actuated safety valve adapted for use with oil tank drainage systems comprising an upright housing, an inlet conduit disposed within one wall of said housing and spaced above the bottom of said housing, an outlet conduit extending outwardly from the lower end of said housing, an inwardly extending, horizontal annular flange arranged within said housing, a frangible disk secured to said annular flange with a clamping ring and a plurality of securing elements which extend through said clamping ring and said disk into said flange, said frangible disk forming a seal between said inlet and said outlet conduits, a shaft bushing on the top of said housing, a gravity-actuated shaft extending through said shaft bushing for vertical reciprocation in said housing to rupture said disk upon a downward movement of said shaft, a plurality of outwardly extending, tapered cutter blades extending over an area of substantially the same size as said disk rigidly secured to the lower end of said shaft for direct engagement with said disk, a pair of parallel collars with central holes received on and secured in spaced relation on said shaft, a weight loosely disposed between said collars, said housing having an access opening therein adjacent said disc to permit replacement of said disc, and a closure plate for said opening.

References Cited in the file of this patent

UNITED STATES PATENTS

| | | |
|---|---|---|
| 480,264 | Johnson | Aug. 9, 1892 |
| 710,091 | Allenou | Sept. 30, 1902 |
| 1,633,923 | Casey | June 28, 1927 |
| 2,079,164 | Glab | May 4, 1937 |
| 2,304,417 | Mason | Dec. 8, 1942 |
| 2,508,987 | Booth | May 23, 1950 |
| 2,667,760 | Curtis | Feb. 2, 1954 |
| 2,697,538 | Seeler | Dec. 21, 1954 |
| 2,863,469 | Casey | Dec. 9, 1958 |

FOREIGN PATENTS

| | | |
|---|---|---|
| 837,054 | Germany | Apr. 17, 1952 |